United States Patent [19]

Thoen

[11] Patent Number: 5,124,626

[45] Date of Patent: Jun. 23, 1992

[54] SINUSOIDAL SIGNAL AMPLITUDE AND PHASE CONTROL FOR AN ADAPTIVE FEEDBACK CONTROL SYSTEM

[75] Inventor: Bradford K. Thoen, Eden Prairie, Minn.

[73] Assignee: MTS Systems Corporation, Eden Prairie, Minn.

[21] Appl. No.: 630,508

[22] Filed: Dec. 20, 1990

[51] Int. Cl.$^5$ .............................................. G05B 11/42
[52] U.S. Cl. .................................... 318/610; 318/609; 364/161; 364/162; 364/163
[58] Field of Search ...................... 318/560–625; 328/25, 136; 364/160–169; 307/260, 271

[56] References Cited

U.S. PATENT DOCUMENTS

| | | | |
|---|---|---|---|
| 4,390,942 | 6/1983 | de Keizer | 364/162 |
| 4,549,123 | 10/1985 | Hägglund et al. | 318/610 |
| 5,059,880 | 10/1991 | Hiroi | 318/610 |

OTHER PUBLICATIONS

Widrow and Stearns, Adaptive Signal Processing, Prentice-Hall, 1985, Chapter 6.

Gold and Raderm, Digital Signal Processing of Signals, McGraw-Hill, 1969, pp. 90–92.
Bellanger, Digital Processing of Signals, Wiley, 1984, pp. 251–252.

Primary Examiner—Paul Ip
Attorney, Agent, or Firm—Kinney & Lange

[57] ABSTRACT

In a feedback control system, a reference input element adjusts the amplitude and phase of a sinusoidal component of a command signal applied to the control system to cancel the transfer effects of the feedback loop, substantially eliminating error between a feedback signal and the common signal. The reference input element processes the sinusoidal component of a command signal through a network metaphor of a trigonometric identity. Adjustment of weights of the trigonometric identity permits arbitrary adjustment of the amplitude and phase of the command signal. A comparison of the command signal and the feedback signal, or of analogous signals, is used as an input to an automated trigonometric identity weight adjustment routine in the reference input element.

28 Claims, 14 Drawing Sheets

```
/*****************************************************************/
/* static variables */ static void (*class[3])();            /* class methods */
/*****************************************************************/
/* methods */ static void doit(d)
    register instData   *d;
{
    fltdsp      cmd, lastCmd, lastMean, oldCmd;
    fltdsp      drv;
    fltdsp      candPeak, step;
    fltdsp      w0, w1;
    fltdsp      auth;
    fltdsp      zeroX;
    boolean if (!d->crs.enable) return;

/* fill entries */
    lastCmd = d->srs.cmd - d->srs.mean;
    lastMean = d->srs.mean;
    d->srs.cmd = *d->cmd;
    d->srs,mean = *d->mean;
    d->srs.fbk = *d->fbk;

/* remove dc component */
    cmd = d->srs.cmd - d->srs.mean;
    fbk = d->srs.fbk - d->srs.mean;

/* pause adaptation if mean is changing or command is unchanging */
    if ((d->srs.mean != lastMean)    || (cmd == lastCmd))
        d->pause = d->pauseIntvl;
```

Fig.12A

```
/* check for command zero crossing */
zeroX = (cmd * lastCmd < 0.0);

/* update phase-splitters */
oldCmd = iirBiq(cmd, d->crs.coefB, d->cmdStateB);
cmd    = iirBiq(cmd, d->crs.coefA, d->cmdStateA);
oldFbk = iirBiq(fbk, d->crs.coefB, d->fbkStateB);
fbk    = iirBiq(fbk, d->crs.coefA, d->fbkStateA);
/* update peak feedback estimate & convergence gain */
candPeak = xabs(fbk);
if (candPeak > d->peak)
    d->peak = candPeak;
else
    d->srs.conv = (d->peak >0.0) ? d->crs.norm / xsqr(d->peak) :0.0;
if (xeroX)
    d->?peak *= d->crs.decay;

/* do controller */
d->srs.drv = d->srs.mean + d->srs.w0 * cmd + d->srs.w1 *w1 * oldCmd;

/* do estimator */
if (!d->pause)
{
    drv = d->srs.drv - d->srs.mean;
    d->srs.err = drv - (d->srs.w0 * fbk + d->srs.w1 * oldFbk;
```

Fig.12B

```
        step = d->srs.conv * d->srs.err;
        w0 = d->srs.w0 + step * fbk;
        w1 = d->srs.w1 + step * oldFbk;
        auth = w0 * w) + w1 * w1;
        if ((d->crs.minAuth <= auth) && (auth <= d->crs.maxAuth))
        {
            d->srs.w0 = w0;
            d->srs.w1 = w1;
        }
    }
    else
    {
        d->srs.err = 0.0;
        if (zeroX)
            d->pause--;
    }
} static void write(d, srs)
    instData    *d;
    srss        *srs;
{
    *srs = d->srs;
} static void read(d, crs)
    register instData   *d
    crss                *crs;
    register fltdsp     *state;
{
    d->crs = *crs;

if (d->crs.pause > 0)
    {   d->pauseIntvl = d->crs.pause;
        d->pause = d->crs.pause;
```

Fig. 12C

```
}
/* if reset, initialize phase-splitters */
if (d->crs.reset)
{   state = d->cmdStateA;
    *state++ = 0.0;
    *state++ = 0.0;
    *state++ = 0.0;
    *state++ = 0.0;
    *state++ = 0.0;
    *state++ = 0.0;
    *state++ = 0.0;
    *state++ = 0.0;
}

/* if tapInit, initialize estimator taps */
if (d->crs.tapInit)
{   d->srs.w0 = 1.0;
    d->srs.w1 = 0.0;
}
}
```

*Fig.12D*

```
/*****************************************************/
/* object creation procedure */ uns16 apcobjNew(cls, data)
    classes  *cls;
```

```
{
    pointer   *data;
    instData  *d;

*cls = (classes)class;
    if (NULL ==(instData *)heap1Alloc(sizeof(instData)))) return 1;
    *data + (pointer)d;

d->cmd        = &d->srs.cmd;
    d->mean       = &d->srs.mean;
    d->fbk        = &d->srs.fbk;
    d->err        = &d->srs.err;
    d->drv        = &d->srs.drv;
    d->conv       = &d->srs.conv;
    d->pause      = 0;
    d->peak       = 0.0;
    d->crs.enable = FALSE;
    d->cmd        = 0.0;
    d->mean       = 0.0;
    d->fbk        = 0.0;
    d->err        = 0.0;
    d->drv        = 0.0;
    d->conv       = 0.0;
    d->srs.w0     = 1.0;
    d->srs.w1     = 0.0;
    return 0;
}
```

Fig. 12E

```
/*******************************************/
/* class creation procedure */ void apcClsNew()
{
    class[0] = doit;
    class[1] = write;
    class[2] = read;
}
/*******************************************/
```

Fig. 12

SINUSOIDAL SIGNAL AMPLITUDE AND PHASE CONTROL FOR AN ADAPTIVE FEEDBACK CONTROL SYSTEM

FIELD OF THE INVENTION

The present invention relates to a control system element for phase and gain adjustment of a sinusoidal command signal applied to a control system, and more particularly, to a reference input element for adjustment of the command signal to substantially eliminate amplitude and phase differences between the command signal and a measurement of the response of a control loop.

BACKGROUND OF THE INVENTION

A feedback control system is a system that operates to achieve prescribed relationships between selected system variables by comparing functions of those variables and using the comparison to effect control. System variables are those quantities or conditions of the system which are subject to change. Examples of such variables include an electrical voltage level generated by an amplifier or physical force applied to a specimen by a servoactuator. Control is the governing of the response of a controlled subsystem, e.g. rotational velocity of an electrical motor, strain in a structural member of a truss, or position of an elevator.

Feedback control systems are conceptually divided into two portions, the controlled subsystem and a controlling subsystem. The controlling subsystem manipulates the controlled subsystem. The elements of the controlling subsystem can include reference input elements, forward controlling elements, feedback elements and a summing point or analogous operational element. Reference input elements are transfer elements which receive and modify an applied command signal into a form which serves as a standard of comparison for the directly controlled variable, i.e. the measured response of the controlled system. Put another way, the reference input element, for a steady-state command signal, for fixed forward controlling elements and a fixed controlled subsystem, allows adjustment of the response of the controlled subsystem to desired values. The output of the reference input element is called the reference input signal.

The reference input signal is applied to a feedback control loop. A comparator element or summing point in the feedback loop receives the reference input signal and compares it to a feedback signal for generating an error or difference signal. Forward controlling elements operate on actuation signals. The forward controlling elements may include an element for tuning of the feedback loop and includes an element for varying a directly manipulated variable applied to the controlled subsystem. The forward controlling elements provide conversion of electrical signals operable on by the control system into a directly manipulated variable, such as force, for application to the controlled system. The forward controlling elements may also add energy to the system. An example of a forward controlling element is a servohydraulic actuator, used to generate a force vector for application to a specimen or to move an object.

The controlled subsystem of the feedback loop responds to the directly manipulated variable. Strain on a structural member in a body receiving the force is an example of such a response. A particular response of interest is the output response. The output response of interest of the controlled subsystem is measured by a feedback element to generate the feedback signal. Feedback elements include transducers such as pressure sensors or strain gauges, which generate an electrical signal proportional to the output response. The feedback signal is returned to the summing junction or element. The summing junction, forward controlling elements, controlled subsystem and feedback element are an independent control loop, and operate as a subsidiary control system within another control system.

Among tens of thousands of contemporary uses of feedback control is its use in fatigue testing of specimens. Fatigue in a specimen is a function of the prolonged imposition of cyclic stress on the specimen. Application of a periodically varying load on a specimen is one way of generating mechanical stress. An engineer interested in fatigue in one or more structural members of an aircraft wing can select a measurable variable, such as strain, as a way of recording the history of fatigue development in the member. Actuators receiving actuation signals generate variable and static loads for imposition on a specimen. Responsive strain in various members can then be measured by strain gauge transducers attached to the members. The measurements are monitored as outputs and provide feedback to the controlling system to govern the process.

Engineers may desire that the output response follow a predetermined set of values. In the example of the aircraft wing given above, it might be desired that strain imposed on the selected member follow a predetermined function. To achieve this goal, manual tuning of the feedback control system has been required. Tuning is an adjustment in relation to frequency of the system to secure optimum performance here to produce a feedback signal having the desired function. However, any change in frequency or amplitude of the command signal, or to the static component of the command signal, or change occurring in the controlled element, has, in most prior art systems, necessitated retuning.

The foregoing discussion has dealt primarily with the effects on a feedback control system of changes in operating conditions or in system elements transfer functions. External disturbances can also effect any system variable. While such disturbances do not, strictly speaking, change the transfer function of the system, they can affect system accuracy in following the desired function values. Modifications to feedback control systems which promote system stability are, all other factors being equal, beneficial.

Other factors can also influence the extent to which the directly controlled variable exhibits the desired function. Under the influence of an experiment, physical changes can occur in the controlled subsystem which change its transfer characteristics over time. Such changes affect the output response generated by a particular actuation signal and have necessitated repeated retuning of a control system in some experiments.

When tuning a control system for a given performance level, control engineers have typically required knowledge of the amount of gain and phase shift experienced by signals propagating inside the feedback loop. At certain critical frequencies these are known as the gain and phase margins of the system. These quantities, taken with certain simplifying assumptions, have been used by the engineer to determine what the controller gains must be to achieve a given performance level. If the control engineer has not been able to analytically derive the gain and phase margins from physical principles, he has had to measure them directly. Typically, the measurements have been taken by observing control loop signals on an oscilloscope. A more automated approach to measurement is taken by Hägglund et al, U S. Pat. No. 4,549,123, wherein a specialized controller called a "relay autotuner" is connected to the system allowing the gain margin to be measured directly. However, Hägglund requires self-oscillation before the essential process quantities can be measured, and Hägglund does not measure phase margin, only gain margin.

SUMMARY OF THE INVENTION

In accordance with the principles of the invention, an indication of the transfer function of a feedback loop in a feedback control system is used to determine adjustment of the transfer function of a reference input element.

The feedback control system includes a reference input element and a feedback loop comprising control system actuators, a controlled subsystem, a feedback element and a summing junction. The forward actuators and controlled subsystem have substantially linear transfer functions but with unknown and potentially changing parameters. The output of the reference input element, called the reference input signal, and the feedback signal are compared to produce a difference signal which is applied to the forward controlling elements in the feedback loop.

The reference input element adjusts the amplitude and phase of a sinusoidal component of a command signal applied to the control system to cancel the transfer effects of the feedback loop, substantially eliminating error between a feedback signal and the command signal. Alternatively, a predetermined phase relationship between command and feedback signal is also possible with use of a delay or phase offset element. The reference input element processes the sinusoidal component of a command signal through a network metaphor of a trigonometric identity. Adjustment of weights of the trigonometric identity permits arbitrary adjustment of the amplitude and phase of the command signal.

The reference input element compares a feedback signal and the reference input signal to measure the transfer function through the feedback loop. The reference input element adjusts its own transfer function to cancel the effects of the closed loop transfer function of the feedback loop by changing weights of the terms of the trigonometric identity. The change in weights results in an amplitude change and a phase shift of the sinusoidal portion of the reference input signal relative to the command signal. The reference input element itself is tolerant of transient non-sinusoidal changes in the command signal.

The reference input element may be provided by a digital signal processor, programmed to operate as a circuit metaphor of a signal amplitude and phase adjustment network. The amplitude and phase adjustment network metaphor includes a signal splitting element coupled to the function generator which applies a predetermined phase shift between a pair of output signals. The pair of output signals are applied to separate transmission paths, each of which includes a weighting element by which the amplitude of the respective output signals of the signal splitting element are independently adjusted. The first and second paths meet at a summing junction where the output signals are combined. Where the command signal generated by the function generator is sinusoidal, the sum of the output signals is also sinusoidal. The reference input signal has the same frequency as the command signal, but is of arbitrary amplitude and phase relative to the command signal. The amplitude and phase depend upon the weight factors selected for the weighting elements.

The weighting factors for the weighting elements are determined by an estimator network operating upon the reference input signal and a phase and amplitude shifted signal developed from feedback signal. The estimator network includes a signal splitting element, applying the output of the feedback element onto first and second transmission paths with a predetermined phase difference between the paths. A weighting element in each path independently adjusts the amplitude of the signal and the resulting signals are summed to develop a feedback reference signal. A comparator takes the difference of the reference input signal and the feedback reference signal to generate an estimation error signal. A weight adjustor takes the estimation error signal as an input and adjusts the first and second independent weighting factors, as required, for driving the estimation error signal to zero. The effect of the continuing adjustment of the weighting factors is the dynamic adjustment of the transfer function of the reference input element, canceling the effect of the closed loop transfer function and resulting in a feedback signal having substantially the same frequency amplitude and phase as the command signal.

The invention is also applicable to multiple actuator, multiple control channel environments. Where multiple actuators are used for control of a single specimen, employment of amplitude and phase adjusting reference input elements in each channel provides coordination between the actuators.

BRIEF DESCRIPTION OF THE DRAWINGS

FIGS. 12A–F are a listing of a program for a digital signal processor for implementation of a metaphor for the amplitude/phase controller of FIG. 1

DETAILED DESCRIPTION OF THE PREFERRED EMBODIMENTS

Figure 1:
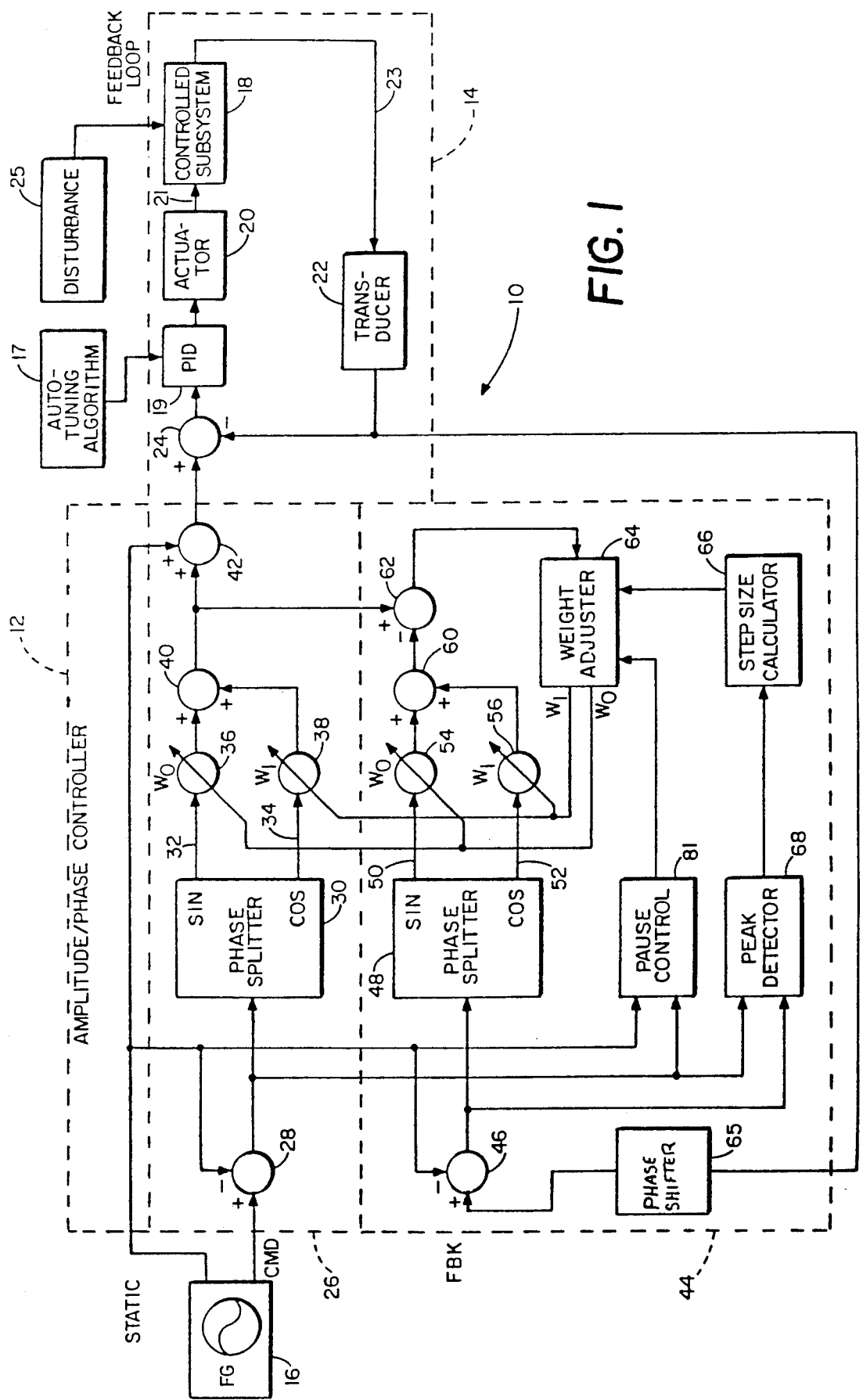
FIG. 1 is a block diagram of an adaptive feedback control system including a block diagram metaphor for an amplitude/phase controller for a command signal applied to the control system.

FIG. 1 illustrates a control system 10 in block diagram form. Control system 10 includes an amplitude/phase controller 12 and a subsidiary feedback loop 14. Control system 10 is connected to a function generator 16 for excitation by a command signal. The command signal consists of a sinusoidal component ($\sin(\omega t)$) and of an optional, modifiable static component or mean offset. Feedback control system 10 controls the output response of a controlled subsystem 18 located in feedback loop 14.

Feedback loop 14 is a conventional negative feedback control loop. Feedback loop 14 includes a summing element 24 which subtracts a feedback signal from an input signal to generate an error signal. A servocontroller 19 operates on the error signal for generating an actuation signal. Servocontroller 19 is preferably a Proportional-Integral-Derivative (PID) servocontroller. An actuator 20 operates on the actuation signal for applying a directly manipulated variable, indicated by arrow 21, to controlled subsystem 18. The output response of controlled subsystem 18 is the directly controlled variable, indicated by arrow 23. The output response 23 is measured by transducer 22, which generates the feedback signal. Adjustment of the transfer parameters of servocontroller 19 is possible through an autotuning algorithm 17.

Feedback loop 14 has linear adjustment effects on an applied sinusoidal input signal, resulting in attenuation (or gain) in the amplitude of the signal by a factor T and/or a shift of the phase angle of the signal by an angle $\phi_T$. The feedback signal remains approximately sinusoidal and, absent occurrence of non-sinusoidal transients in the input signal, has the same frequency as the input signal applied to summing junction 24. Disturbance effects 25, applied to controlled subsystem 10, may be assumed to be substantially random in the sense that they are not predictable in instantaneous value as a function of time. The time varying component of the feedback signal (and the directly controlled variable) is shifted relative to a sinusoidal input ($\sin(\omega t)$) in a predictable manner in accordance with the function:

$$F(t) = T \sin(\omega t + \phi_T) + N(t) \quad (1)$$

where T is a constant, $\omega$ is a frequency, t is time, $\phi_T$ is a phase angle, and N(t) is an unpredictable noise factor from a noise or disturbance source 25. An example of a feedback loop 14 exhibiting such linear transfer characteristics would be one where the controlled system 18 is an automobile suspension and actuator 20 is a servohydraulic mechanism. Those skilled in the art will recognize that equation (1) reflects the response characteristics of a substantially linear system.

As stated above, a preferred embodiment of the invention operates to match amplitude and phase of the sinusoidal portion of the feedback signal to the sinusoidal portion of the command signal. The amplitude and phase differences exhibited by the feedback signal F(t) versus the command signal are compensated for by signal processing of the command signal to eliminate the differences. This signal processing is done by automatic amplitude/phase controller 12, which is interposed between function generator 16 and feedback loop 14. Amplitude/phase controller 12 boosts (or attenuates) the amplitude of an input sinusoidal signal by a factor $T^{-1}$ and shifts the phase of the signal by an angle $-\phi_T$. Where the command signal is sinusoidal, the combined effect of the amplitude/phase controller 12 with feedback loop 14 on the time varying output response of the system is of the form:

$$F(t) = T/T \sin(\omega t + \phi_T - \phi_T) + N(t) \quad (2)$$

which reduces to:

$$F(t) = \sin(\omega t) + N(t). \quad (3)$$

The network topography of amplitude/phase controller 12 implements a trigonometric identity, which permits arbitrary adjustment of the amplitude and phase of the sinusoidal portion of the command signal. The trigonometric identity implemented is:

$$w_0 \sin(\omega t) + w_1 \sin(\omega t + \phi) = C \sin(\omega t + \phi_c) \quad (4)$$

where $$C = (w_0^2 + w_1^2 + 2 w_0 w_1 \cos(\phi))^{\frac{1}{2}} \quad (5)$$

and $$\phi_c = \tan^{-1}\left[\frac{w_1 \sin(\phi)}{w_0 + w_1 \cos(\phi)}\right] \quad (6)$$

and where $w_0$ and $w_1$ are weights, C is a scalar and $\phi$ is the phase difference of equation (4) and $\sin(\phi_c)$ is non-zero. Stated in words, the weighted sum of two sinusoids of the same frequency, but of differentiated phase, yields a third sinusoid of the same frequency, shifted in amplitude depending upon the absolute amplitudes of the first two sinusoids and shifted in phase depending upon the relative amplitudes of the first two sinusoids. The trigonometric identity of equations of (4) to (6) is valid only for zero mean sinusoidal signals.

Amplitude/phase controller 12 includes a command signal correction network 26 for amplitude and phase adjustment of the command signal. Command signal correction network 26 takes the command signal and a static component signal from function generator 16 as inputs and generates a corrected command signal, called the reference input signal, as an output. Function generator 16 generates a command signal having a sinusoidal component and a non-sinusoidal component, which is called the static component. While the static component may vary, it can be treated at the frequencies associated with the sinusoidal component of the command signal as being essentially non-varying with respect to time. The static component signal is subtracted from the command signal by a summing element 28 and the sinusoidal component of the command signal is passed to a phase splitter 30 for amplitude and phase adjustment.

The trigonometric identity of equations (4) through (6) is implemented in command signal correction network 26 by phase splitter 30, adjustable gain elements 36 and 38, which are located in phase differentiated signal paths 32 and 34 respectively, and a summing element 40, which combines the signals from signal paths 32 and 34. Phase splitter 30 replicates the command signal on signal paths 32 and 34, but with approximately a 90° angular shift between the signals. The phase differentiated signals are weighted, i.e. their amplitudes are attenuated or amplified by weighting elements 36 and 38, and the weighted signals are summed by summing element 40 to produce a phase and amplitude adjusted sinusoidal signal in conformance with the identity of equation (4). Summing element 42 restores the static component to the adjusted sinusoidal portion to develop a reference input signal, which is applied to feedback loop 14.

Automatic matching of the sinusoidal portions of the feedback signal and the command signal requires comparison of the command and feedback signals, or substitutes therefore. A comparison of any two signals typically involves generation of a difference or error signal. While direct comparison of the feedback signal and the command signal is possible, the network topography of amplitude/phase controller 12 implements a comparison of substituted signals. The reasons for doing so are elaborated upon below. To implement a comparison of substituted signals, the feedback signal is processed in an identical manner to the command signal. The phase and amplitude adjusted sinusoidal portion of the command signal is compared to the phase and amplitude adjusted feedback signal by subtraction of the latter signal from the former. The resulting signal is called the estimation error signal. Generation of the estimation error signal is essential to operation of estimator network 44, which is set forth in detail below. A phase shift element 65 is optionally interposed between transducer 22 and operational elements of estimation network 44. Phase shift element 65, when present, is used to introduce an arbitrary phase angle to the feedback signal, resulting in a selectable phase difference between control and feedback signals. Phase shift element 65 is shown as part amplitude phase controller 12 to indicate that it is part of the digital signal processor on which controller 12 is implemented.

The trigonometric identity of equations (4) through (6) is implemented in estimator network 44 for processing the feedback signal. A summing element 46 is used to remove an estimate of the static portion of the feedback signal. The static portion of the command signal is used for this purpose. Phase splitter 48 replicates the feedback signal on signal paths 50 and 52, again with approximately a 90° angular shift between the signals. The phase differentiated signals are weighted, i.e. their amplitudes are attenuated or amplified by weighting elements 54 and 56, and the weighted signals are summed by summing element 60 to produce a phase and amplitude adjusted feedback signal, in conformance with the identity of equation (4). Summing element 62 subtracts the processed feedback signal from the processed sinusoidal portion of the command signal, generating the estimation error signal.

Theoretically the trigonometric identity underlying the signal processing of amplitude/phase controller 12 will work with any phase shift $\phi$ except 0° or 180°. In practice the best choice of a phase shift is $-90°$ or $+90°$. There are several reasons for this, which are elaborated upon below. The 90° phase difference is substantially constant, regardless of frequency changes in the command signal.

Figure 2:
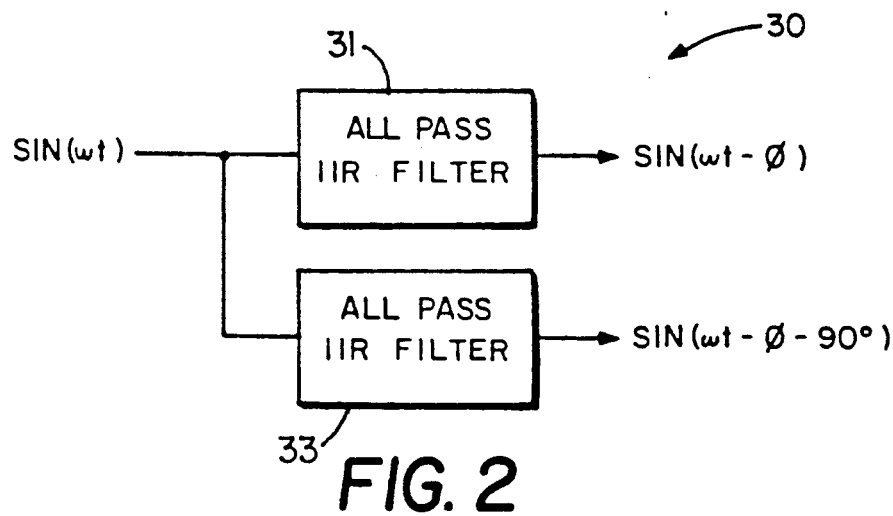
FIG. 2 is a block diagram of a phase splitting element.

FIG. 2 illustrates phase splitter 30, but is equally applicable to phase splitter 48, which is identical. Phase splitter 30 consists of two allpass infinite impulse response (IIR) digital filters 31 and 33, each acting on a sinusoidal input to produce two sinusoids, approximately 90° out of phase with one another. The design procedure for these digital filters involves approximating a $-90°$ phase shift over a specified frequency range. The approximation can be relatively coarse (e.g., $-90° \pm 20°$) without adversely affecting the operation of amplitude/phase controller 12. Alternatively, delay lines may be used instead of phase splitters to introduce a phase difference between signals on parallel transmission lines.

The net effect on the zero-mean, sinusoidal portion of the command signal of amplitude/phase controller 12 and feedback loop 14 is the product of the signal effects of the two elements or:

$$F(t) = CT \sin(\omega t + \phi_c + \phi_T) + N(t) \qquad (7)$$

and thus, where C equals $T^{-1}$, the inverse of T, and $\phi_c$ equals $-\phi_T$, the effects of amplitude/phase controller 12 and feedback loop 14 cancel, leaving the command signal and feedback signal substantially equal, except for the noise factor N(t).

Again referring to FIG. 1, control system 10 is an adaptive system, meaning it monitors its own performance and varies its own parameters to improve its performance. Optimal performance is characterized as operation of control system 10 with a null estimation error signal. The operating parameters subject to virtually continuous correction are the weights $w_0$ and $w_1$, which are used in processing of the command signal and the feedback signal. Amplitude/phase controller 12 automatically provides updates of parameter weights $w_0$ and $w_1$ through operation of estimator network 44 Estimator network 44 iteratively optimizes values for weights $w_0$ and $w_1$ for the elimination of amplitude and phase differences between the zero mean, sinusoidal portion of the command signal and the zero mean, sinusoidal portion of the feedback signal. This is achieved by forcing the estimation error signal (e(t)) to zero. As previously noted, the estimation error is preferably a difference signal generated from a comparison of the zero-mean, sinusoidal component of the reference input signal, and a phase and amplitude adjusted signal derived from processing of the feedback signal.

Estimator network 44 operates on four input signals, the sinusoidal portion of the reference input signal, taken from summing element 40, the sinusoidal portion of the command signal, taken from summing element 28, the static component of the command signal, taken from function generator 16, and the feedback signal from feedback loop 14. The signals are processed to provide the estimation error signal, to provide inputs to network elements related to noise and transient condition tolerance, and, most importantly, to provide adjustment of weights $w_0$ and $w_1$.

As noted above, the trigonometric identity implemented by amplitude/phase controller 14 is valid only for zero mean signals. Accordingly, any non-zero component of the feedback signal must be subtracted from the feedback signal, just as the non-zero portions of the command signal are eliminated in command signal correction network 26, before any amplitude and phase adjustment of the feedback signal. Preliminary signal conditioning is provided by subtraction of an estimate of the static portion of the feedback signal from the feedback signal by summing element 46. The static component of the command signal is used as a substitute for determining the non-zero mean portion of the feedback signal. Implicitly, it is assumed that feedback loop 14 controls mean signals levels, and that the mean level of the feedback signal is the same as that for the command signal.

As previously set forth, estimator network 44 applies the same relative amplitude and phase changes to the zero-mean, sinusoidal portion of the feedback signal as command signal adjustment network 26 does to the zero-mean, sinusoidal portion of the command signal to produce a phase and amplitude adjusted sinusoidal signal, in conformance with the identity of equation (4). The weights applied, $w_0$ and $w_1$, are the same as the weights applied to scale the phase differentiated signals in the command signal correction network 26. The signal generated is referred to as the reference adjusted feedback signal and functionally is expressed:

$$F(t) = C^2 T \sin(\omega t + \phi_T + 2\phi_c) + N(t) \tag{8}$$

The sinusoidal portion of the reference input signal and the reference adjusted feedback signal are compared by summing element 62 to generate the estimation error signal e(t). It will now be apparent to those skilled in the art that the estimation error signal can be derived in other ways, such as a direct comparison of the sinusoidal portions of command signal and the feedback signal. The use of signal processed substitutes for the command and feedback signals reflects choice of at least means square algorithm for determination of weights $w_0$ and w. The processed versions of the signals give a relatively smooth parabolic surface, with a well defined global minimum. The global minimum corresponds to the instantaneous desired weights $w_0$ and w. Direct use of the command signal and the feedback signal tends to generate a parabolic surface with local minima, complicating the process of determining the desired weights. Existence of local minima, and the additional processing required to escape them, can lead to a greater degree of hunting in control system 10. Thus, in the experience of this inventor, the use of processed substitutes of the signals of interest promotes more stable operation of control system 10.

Adjustment of the weights $w_0$ and $w_1$, which are used by weighting elements 36, 38, 54 and 56 for signal processing, is done by a weight adjuster element 64 in response to the estimation error signal and a step size calculator 66. An initial explanation of the operation of weight adjuster 64 need not refer to step size calculator 66. Ignoring the noise term, the output of comparator 62 is the sinusoidal part of the reference input signal less the adjusted feedback, signal, which functionally expressed is:

$$e(t) = C \sin(\omega t + \phi_c) - C^2 T \sin(\omega t + \phi_T + 2\phi_c). \tag{9}$$

Setting e(t)=0 gives:

$$C \sin(\omega t + \phi_c) = C^2 T \sin(\omega t + \phi_T + 2\phi_c), \tag{10}$$

which reduces to:

$$\sin(\omega t) = CT \sin(\omega t + \phi_T + \phi_c) \tag{11}$$

This occurs when $C = T^{-1}$ and $\phi_c = -\phi_T$. Thus, forcing the estimation error to zero results in the weights $w_0$ and $w_1$ that yield the proper amplitude and phase correction.

Weight adjuster 64 implements a Least-Mean-Square (LMS) Algorithm for determining weights $w_0$ and $w_1$. The LMS algorithm is set forth in detail in Widrow and Stearns; Adaptive Signal Processing, Prentice-Hall, 1985, Chapter 6. Other estimator algorithms may be used instead of LMS. Among suitable alternatives are the methods of Recursive Least Squares (RLS) and Maximum Likelihood Estimation (MLE). Implementation of the LMS algorithm is aided by operation of signal processing circuitry in a particular fashion. First, the LMS algorithm converges more quickly for orthogonal (sinecosine) signals. Thus, it is preferred that phase splitters 30 and 48 each introduce a 90° phase difference between their respective outputs. Secondly, the magnitudes of the weights will be smaller when the signals to which they are applied are orthogonal, which is convenient for fixed point arithmetic implementations.

Weight adjuster 64 forces the estimation error to zero by iterative solution of equations 10 and 11 using the LMS algorithm, which has the following form:

$$e_k = y_k - [w_0 w_1]_{k-1} \begin{bmatrix} x_0 \\ x_1 \end{bmatrix}_k \tag{12}$$

$$\begin{bmatrix} w_0 \\ w_1 \end{bmatrix}_k = \begin{bmatrix} w_0 \\ w_1 \end{bmatrix}_{k-1} + \mu \begin{bmatrix} x_0 \\ x_1 \end{bmatrix}_k e_k \tag{13}$$

where k is the present period, k-1 is the period immediately preceding the period k, $\mu$ is step size, $e_k$ is the estimation error signal for period k, $y_k$ is the sinusoidal portion of the reference input signal taken from summing element 40, and $x_0$ and $x_1$ are instantaneous values of the outputs of phase splitter 48, i.e. phase displaced sampled values of the feedback signal. The rate at which the LMS algorithm executed by weight adjuster 64 converges to the optimum weights is proportional to step size $\mu$ and feedback signal power. A large step size or large feedback amplitude speeds up convergence. A small step size or small feedback amplitude slows convergence. If the step size or feedback amplitude is too large the algorithm will oscillate or go unstable. What is desired is a convergence rate that is constant and reasonably fast, yet stable regardless of feedback signal amplitude. Accordingly, step size $\mu$ is varied as a function of feedback signal amplitude.

According to Widrow and Stearns, supra, convergence of the LMS algorithm is guaranteed provided that $$\mu \leq \frac{2}{\text{(number of weights)} \times \text{(signal power)}} \tag{14}$$

In amplitude/phase controller 12, the number of weights is two and the signal power is approximated by the square of the feedback amplitude or $$x_{pk}^2.$$

It is not preferable to run the estimator at the edge of stability, so typically $\mu$ is set to somewhat less than the limit of relationship (14) during each sampling period k. Determination of $\mu$ is done in accordance with the following formula:

$$\mu = \frac{1-\alpha}{X_{pk}^2}, 0 \leq \alpha \leq 1. \tag{15}$$

In equation 15 constant o is called a "forgetting factor" and specifies how quickly weight adjuster 64 drops old data. Weight adjuster 64 operates on roughly $1/(1-\alpha)$ past data samples in determining the weights. Earlier data has little effect on current estimates. The choice of $\alpha$ is usually not critical; typical values lie between 0.9 and 1.0.

The feedback amplitude is estimated by use of a peak detector 68. Because the peak feedback will vary with time, step size $\mu$ is updated according to the most recent peak at each sampling interval k:

$$\mu_k = \frac{1-\alpha}{(X_{pk}^2)_k}, 0 \leq \alpha \leq 1. \tag{16}$$

The operation of feedback peak detector 68 is critical to the overall stability of amplitude/phase controller 12, as its estimate of the peak is used to control the convergence rate. Since the overriding priority in the design of amplitude/phase controller 12 is stability, the design of peak detector 68 is very conservative, particularly with respect to the updates in peak value estimation that result in an increase in the convergence rate. Since the step size $\mu$ is inversely proportional to peak amplitude, increases in the peak estimate are done quickly, but decreases in peak estimate are done slowly. Thus, peak detector 68 is a "fast attack", slow decay" element.

Figure 3:
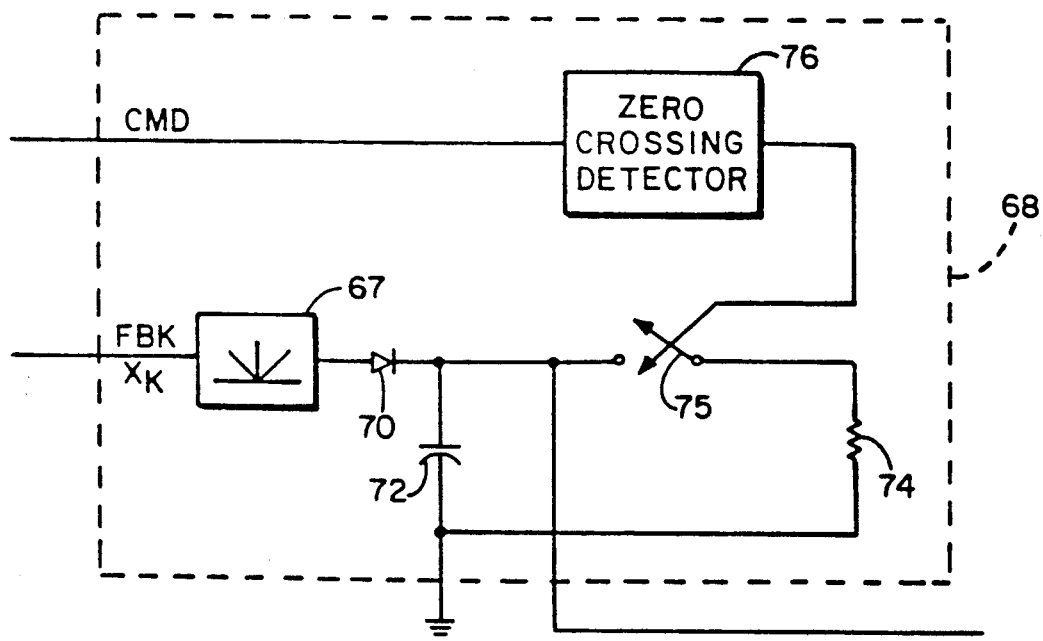
FIG. 3 is a circuit metaphor for a peak detector incorporated in the reference input element of FIG. 1.

FIG. 3 illustrates a peak detector 68 as an electronic circuit for convenience of discussion, though it is actually implemented in software. Peak detector 68 consists of a charge circuit and a discharge circuit. The charge circuit includes an absolute value network 67, diode rectifier 70 operating on the sinusoidal portion of the feedback signal output by network 67 and a capacitor 72, which charges to a new peak value if the present signal value is greater than the past peak value stored in the capacitor. The peak value stored on capacitor 72 slowly discharges through a resistor 74 in the discharge circuit when switch 75 is closed, giving peak detector 68 the ability to track amplitude decreases. However, discharge occurs only when the command signal waveform crosses zero, in effect tying the discharge time constant to the command signal frequency. This makes the discharge time constant appropriate for all frequencies and allows it to be specified in terms of cycles rather than time. The zero crossing detector 76 uses the command signal as input rather than feedback because the command signal is a noise-free signal, simplifying the task of finding zero crossings associated with the signal of interest. Discharge occurs twice per signal cycle or, if the command signal is halted, not at all. This prevents the peak estimate from discharging completely which would cause the step size $\mu$ to become too large.

Again referring to FIG. 1, the correction and the estimator networks together comprise the amplitude/phase controller 12. Estimator network 44 iteratively solves for the optimum weights, which are then copied to the command signal correction network 26. Networks 26 and 45 update at rates typically 10 to 20 times the highest test frequency of interest. The estimator network 44 can be switched off once optimum weights have been found, but leaving it turned on allows it to track changes in test frequency and physical changes in the test specimen (controlled system 18).

Figure 4:
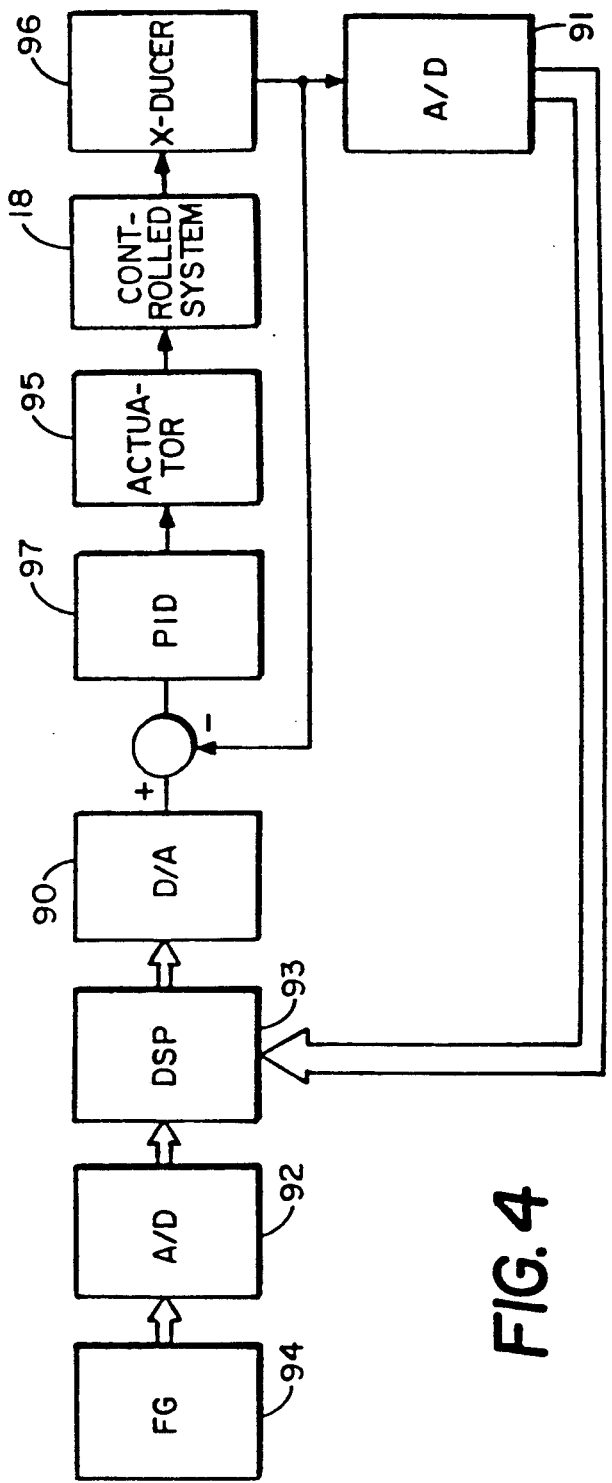
FIG. 4 is a block diagram of a control system implementing the metaphor of FIG. 1

Amplitude/phase controller 12 need not be limited to purely digital control systems. FIG. 4 illustrates placement of analog-to-digital converters 91 and 92 and digital-to-analog converter 90 at the inputs and output of the controller. A programmed digital signal processor 93 works perfectly well with analog function generators and servocontrollers 94 and 97, respectively.

Where it is desired to limit the extent to which amplitude/phase controller 12 can boost or suppress the program signal, minimum and maximum limits are placed on amplitude correction factor C. Using the following approximation of equation (5) with $\phi=90°$, the amplitude/phase controller updates the weights only if $$C_{min}^2 \leq W_0^2 + W_1^2 \leq C_{max}^2. \tag{17}$$

where $C_{min}$ and $C_{max}$ are minimum and maximum allowable correction factors, respectively. Note that the comparisons use the square of the terms to avoid square root operations in real time.

Weight adjuster 64 assumes that its input signals are sinusoidal and of zero mean. Whenever this is not the case, weight adjuster 64 is temporarily switched off. There are two situations when weight adjuster 64 is preferably paused. One of these is when the sine program of function generator 16 is halted. A second is when the program mean level is changed. Pause control 81 determines when these situations arise by comparing the present period command signal and static signal samples with previous command signal and static signal samples. Present period and previous period command signal samples will be the same when the sine program is stopped. Present period and previous period static signal samples will be different when the static signal level is changed.

Because cancellation of the mean component of the feedback signal is never perfect, especially when system 10 is commanded to a new mean level, shifts in mean level create transients in both control system 10 and the phase-splitters 30 and 48 that cause transients in the weight estimates if weight adjuster 64 is left on. Weight adjuster 64 can resume operation a specified number of cycles after the command input is once again sinusoidal and of zero mean. This period should be long enough to reasonably assume that transients have died out.

Amplitude/phase controller 12 can be used to measure the control system's magnitude and phase response by sweeping the program frequency and recording the values of the weights versus frequency. One can then compute the closed loop frequency response $T(\omega)$ by converting the weights into amplitude and phase correction factors $C(\omega)$, $\phi_c(\omega)$, recognizing that $$|T(\omega)| = \frac{1}{C(\omega)} \tag{18}$$

and $$\angle T(\omega) = -\phi_c(\omega). \tag{19}$$

One can also obtain the open loop frequency response $H(\omega)$ using:

$$|H(\omega)| = \frac{1}{\sqrt{C(\omega)^2 - 2C(\omega)\cos(\phi_c(\omega)) + 1}} \tag{20}$$

-continued and $$\angle H(\omega) = -\text{Tan}^{-1}\left[\frac{C(\omega)\sin(\phi_c(\omega))}{C(\omega)\cos(\phi_c(\omega)) - 1}\right] \quad (21)$$

noting that if $\angle H > 0$, then $\angle H = \angle H - 180°$.

By noting when the open loop gain is unity and when the open loop phase is $-180°$, one can directly measure the phase and gain margins of control system 10, respectively. This information can be used by the operator or an autotuning algorithm to set the gains of a servocontroller.

FIGS. 5-10 illustrate performance of a control system 10 using an amplitude phase controller 12 as described herein. In all figures the command signal is indicated by trace 100 and the feedback signal by trace 102.

Figure 5A:
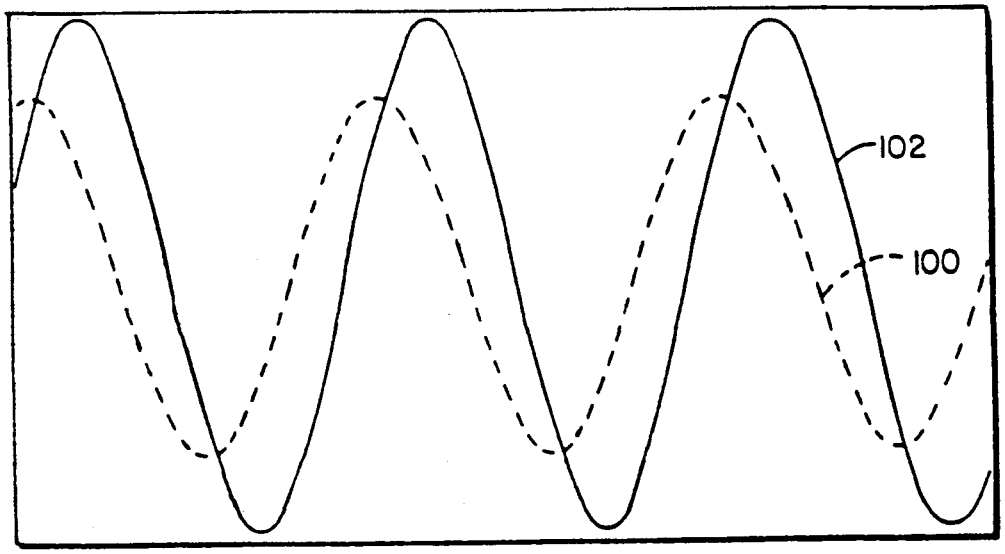
FIGS. 5A and 5B are graphical illustrations of changes in feedback response to a command signal in a control system with amplitude and phase adjustment network turned off-and then on, respectively.
Figure 5B:
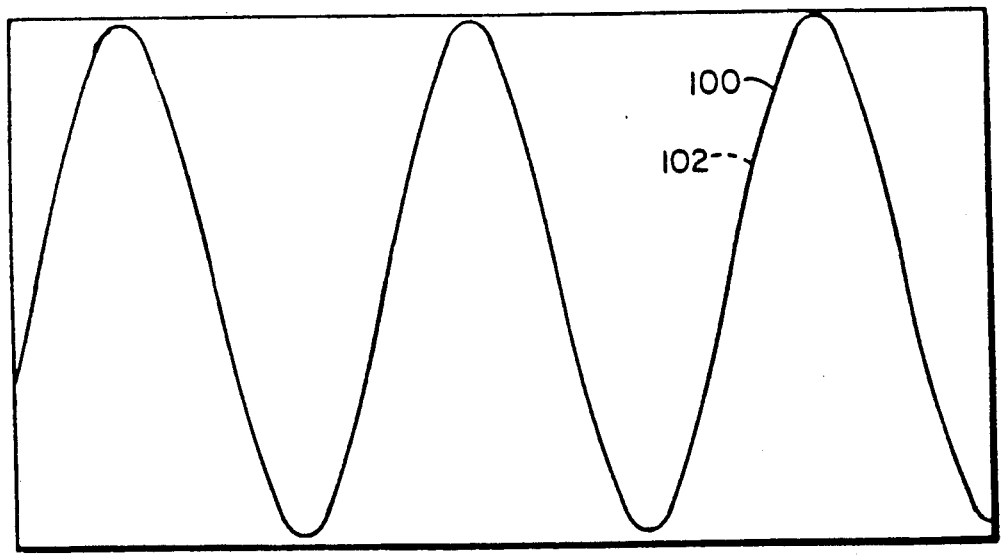

FIGS. 5A and 5B show amplitude/phase controller 12 steady state responses. FIG. 5A shows a substantial mismatch between command signal 100 and feedback signal 102 with the Amplitude/Phase Controller 12 switched off. FIG. 5B shows that after Amplitude/Phase Controller 12 has been switched on, amplitude and phase errors between feedback 102 and command signal 100 disappear.

Figure 6:
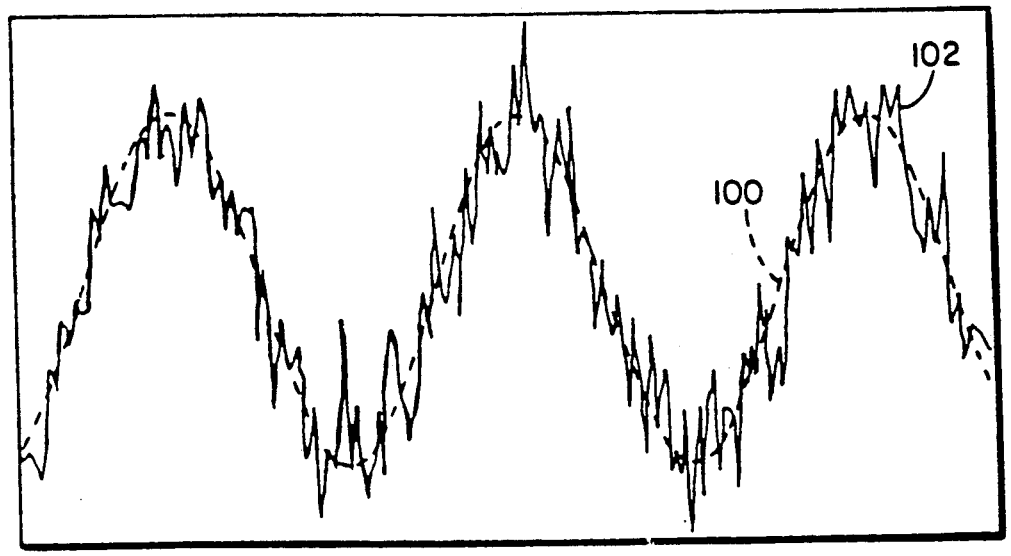
FIG. 6 is a graphical illustration of noise tolerance and feedback response of a control system incorporating amplitude/phase controller.

In FIG. 6, command signal 100 amplitude is low compared to noise on the feedback signal 102. Nonetheless, amplitude/phase controller 12 achieves substantial amplitude and phase matching between command signal 100 and feedback signal 102. Because amplitude/phase controller 12 uses all of the sampling points on the sine wave rather than just the peaks, feedback noise does not degrade control as much as it would with a peak-picking amplitude control algorithm.

Figure 7:
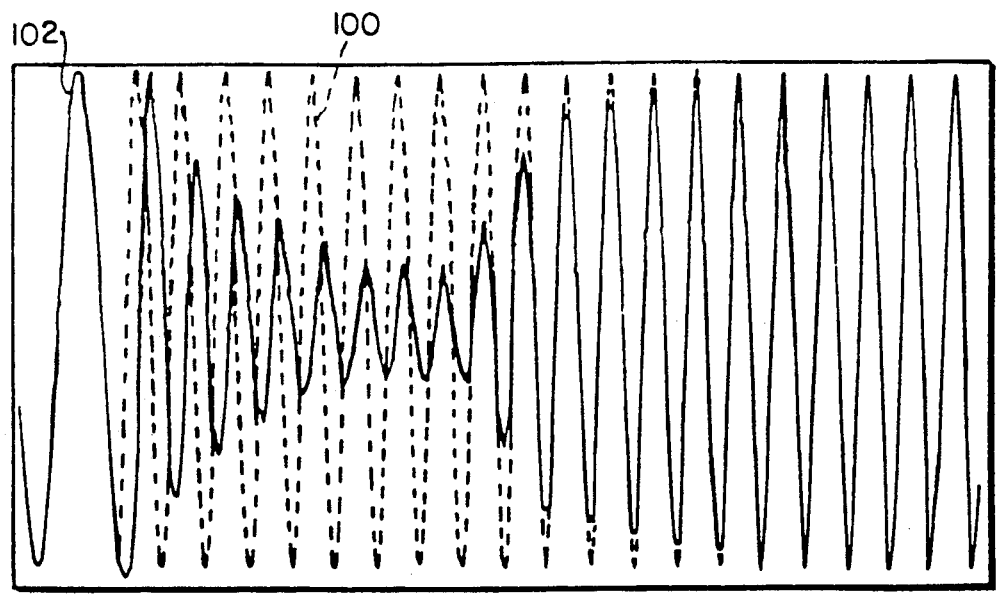
FIG. 7 is a graphical illustration of a feedback control system response to an increase in frequency of the command signal.
Figure 8:
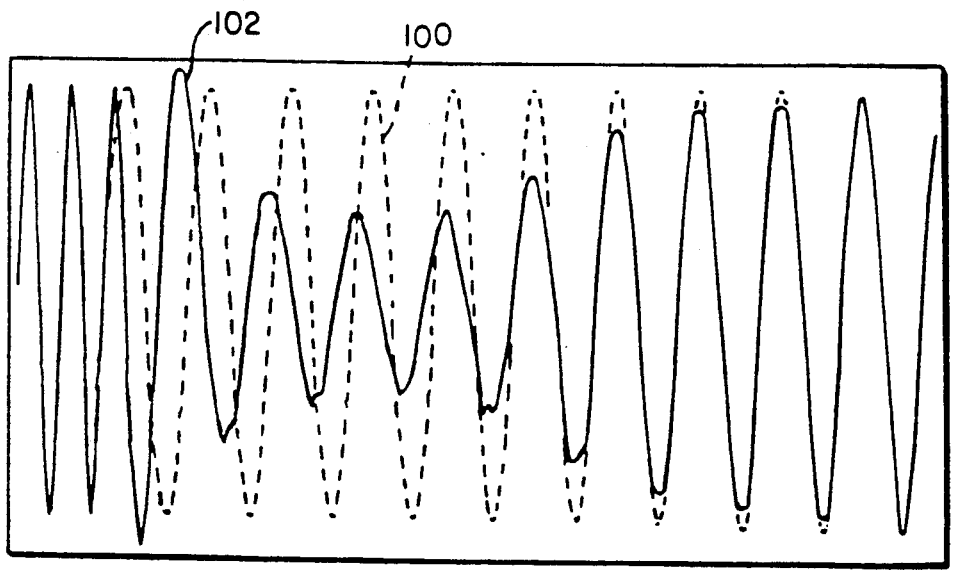
FIG. 8 is a graphical illustration of a feedback control system response to an decrease in frequency of the command signal.

FIGS. 7 and 8 show amplitude/phase controller 12 transient responses to sudden changes in program frequency of command signal 100. FIG. 7 shows the response period in cycles to a doubling of command signal 100 frequency. FIG. 8 shows response of feedback signal 102 to a halving of program frequency. After a brief transition period, the amplitude/phase controller 12 locks onto new amplitude and phase correction factors appropriate for the new frequency.

Figure 9:
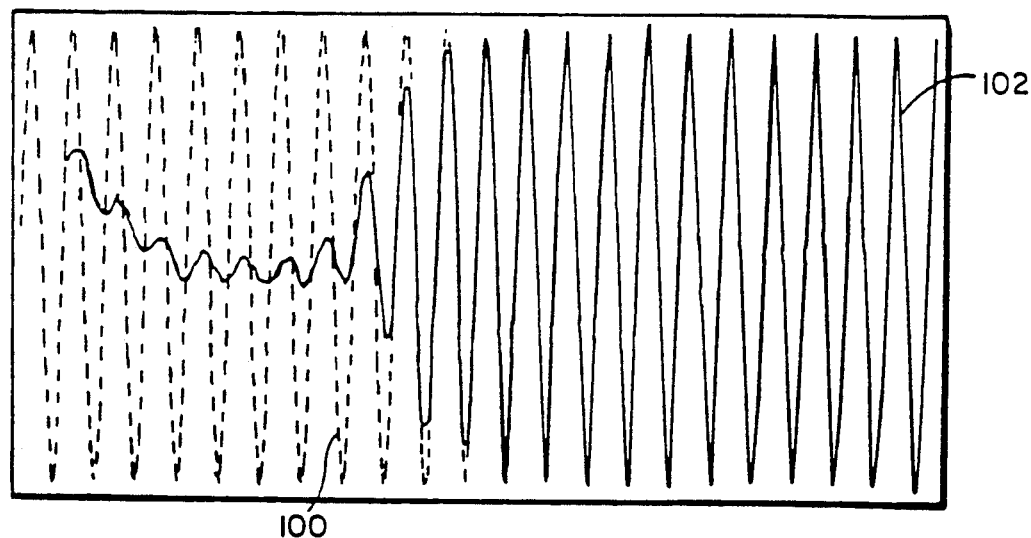
FIG. 9 is a graphical illustration of a feedback control system response to a change in the controlled system's transfer function relating to a decrease in mechanical stiffness of a specimen.
Figure 10:
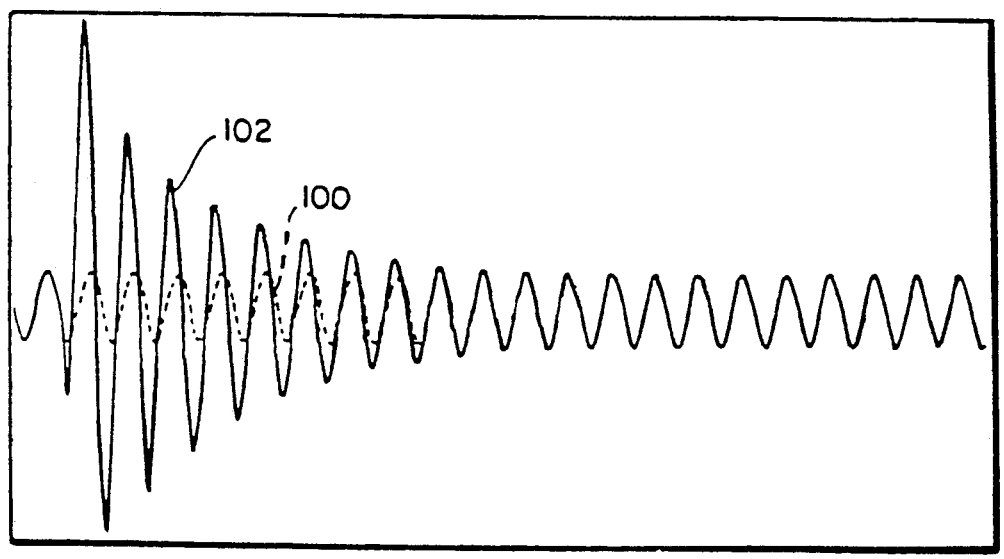
FIG. 10 is a graphical illustration of a feedback control system response to a change in the controlled system's transfer function relating to an increase in mechanical stiffness of a specimen.
Figure 11:
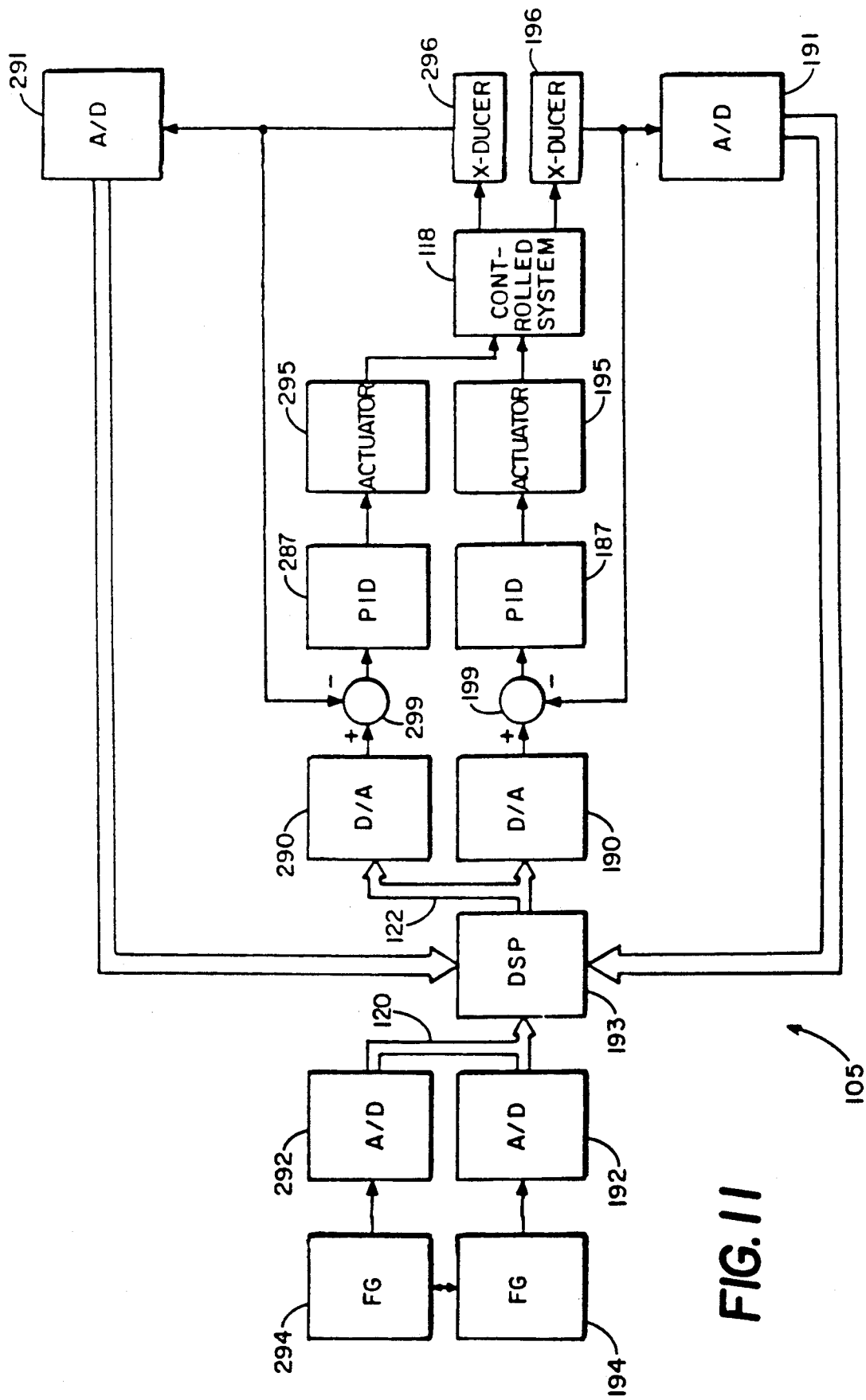
FIG. 11 is a block diagram of a multi-channel feedback control system suitable for employment of command signal amplitude and phase control.

FIG. 9 shows response of feedback signal 102 to a drastic ($\times 10$) decrease in specimen stiffness. FIG. 10 shows tracking response to a factor of 10 increase in specimen stiffness. Since a real specimen was not available in the prototype system, stiffness changes were simulated by altering the gain of a digital-to-analog converter. Note that amplitude/phase controller 12 quickly adjusts to the change within several cycles, displaying an exponential convergence of feedback signal 102 to command signal 100 free of overshoot.

FIG. illustrates a two-channel feedback control system 105, in which the controlled system 118 has the outputs of two actuators 195 and 295 imposed on it. An example of a controlled system 118 where imposition of two, coordinated directly manipulated variables is of interest is an automobile axle where lateral movement of the axle without physical loading is desired. The axle is laterally moved by in phase in position of force at each end of the axle. Force vectors will be in the same direction. Feedback signals relate to axle position.

Function generators 194 and 294 generate sinusoidal command signals of the same frequency ($\omega$) and phase ($\phi$) Where the functions are analog they are converted to digital signals by analog-to-digital converters 192 and 292. The digital signals are applied to digital signal processor 193, which can, depending upon the command signals frequency, handle as many as 12 channels. Digital signal processor 193 generates two phase and amplitude adjusted reference input signals and applies the signals to digital-to-analog converters 190 and 290 for conversion to analog signals. The phase and amplitude adjustment executed by DSP 193 in each channel is program explained above in reference to FIG. 1.

The feedback signals are subtracted from the reference input signals at summing junctions 199 and 299 to generate two error signals. The error signals are applied to PID servocontrollers 187 and 189, respectively, which generate actuation signals. Actuators 195 and 295 respond to the actuation signals to generate directly manipulated variables, such as force, for application to a common controlled system 118, which responds in two directly controlled variables, measured by transducers 196 and 296. The feedback signals generated by transducers 196 and 296 are returned to summing elements 199 and 299, respectively, and, by way of analog-to-digital converters 191 and 291, to digital signal processor 193. DSP 193, by adjusting phase and amplitude of the reference input signals, assumes that the feedback signals, and responses of interest, are in phase because the command signals are in phase. This occurs notwithstanding cross effects between the channels.

Amplitude/phase Controller 12 was prototyped on a AT&T DSP32 floating point digital signal processor and applied to a 22 kip/10 gpm servohydraulic actuator operating in stroke control. Function generator 16 and PID servocontroller 19 were also prototyped on the same digital signal processor. The program implementing amplitude/phase controller 12 was written in the C language and is reproduced in FIGS. 12A-12F.

Although the present invention has been described with reference to preferred embodiments, workers skilled in the art will recognize that changes may be made in form and detail without departing from the spirit and scope of the invention.

What is claimed is:

1. An amplitude and phase controller for a first sinusoidal input signal having a frequency e, the controller comprising:
   a summing element;
   first and second signal transmission paths meeting at the summing element;
   first and second adjustable weighting elements in the first and second signal transmission paths, respectively;
   means for splitting the sinusoidal input signal into first and second phase differentiated signals and transmitting the first and second phase differentiated signals onto the first and second signal transmission paths respecting; and
   means for receiving a second sinusoidal input signal having a frequency e;
   comparator means responsive to the first and second input signals for generating an estimation error signal; and
   weight adjusting means responsive to the estimation error signal for adjusting the gains of the adjustable weighting elements to drive the estimation error signal to a predetermined value.

2. The amplitude and phase controller set forth in claim wherein the weight adjusting means comprises:

means for determining feedback signal peaks;
means responsive to the feedback signal peaks for calculating size of a convergence step; and
iterative means for estimating adjustable weighting element gains that drive the estimation error signal to zero.

3. The amplitude and phase controller of claim wherein the peak detector has a discharge time constant which is signal frequency dependent.

4. The amplitude and phase controller of claim and further comprising a pause controller responsive to non-sinusoidal transients in the command signal for disabling the weight adjusting means.

5. The amplitude and phase controller of claim wherein the second input signal is a feedback signal from a control loop.

6. The amplitude and phase controller set forth in claim 5 wherein the comparator means further comprises:
a second summing element;
third and fourth signal transmission paths meeting at the second summing element;
means for splitting the feedback signal into first and second phase differentiated feedback signals and transmitting the first and second phase differentiated feedback signals onto to the third and fourth signal transmission paths respectively;
third and fourth adjustable weighting elements in the third and fourth signal transmission paths;
the second summing element generating an adjusted feedback thereby;
a comparator element generating an estimation error signal from the difference of the adjusted feedback signal and the reference input signal; and
weight adjusting means responsive to the estimation error signal for adjusting the gains of the adjustable weighting elements.

7. The amplitude and phase controller set forth in claim 6, wherein:
the gains of the first and third adjustable weighting elements are always the same; and
the gains of second and fourth adjustable weighting elements are always the same.

8. The amplitude and phase controller set forth in claim 7 wherein the weight adjusting means comprises:
means for determining feedback signal peaks;
means responsive to the feedback signal peaks for calculating size of a convergence step; and
iterative means for estimating adjustable weighting element gains that drive the estimation error signal to a predetermined value.

9. The amplitude and phase controller of claim 8 wherein the peak detector has a discharge time constant which is signal frequency dependent.

10. The amplitude and phase controller of claim 9 and further comprising a pause controller responsive to non-sinusoidal transients in the command signal for disabling the weight adjusting means.

11. The amplitude and phase controller set forth in claim 1, wherein the means for splitting the sinusoidal input signal produces substantially orthogonal phase differentiated signals.

12. The amplitude and phase controller of claim 1 and further comprising delay line means for applying a selectable phase delay into the feedback signal.

13. A feedback control system for providing an output response substantially tracking a sinusoidal component of a command signal, the feedback control system comprising:
a command signal gain and phase adjustment network including a signal splitter with two substantially 90° phase differentiated output paths for the sinusoidal component of the command signal, an adjustable gain element in each output path, and summing means for summing signals on the output paths and providing a reference input signal;
a feedback loop including an actuator for generating a directly manipulated variable, a controlled subsystem taking as input the directly manipulated variable and producing an output response, a feedback element measuring the output response, and summing means for subtracting the measurement of the feedback element from the reference input signal and for generating a difference signal; and
an estimation network including means comparing the feedback signal and the command signal for generating an error estimation signal and means responsive to the error estimation signal for iteratively determining the gains of the adjustable gain elements required to drive the estimation error signal to zero.

14. The feedback control system of claim 13 wherein the estimation network further comprises:
a feedback measurement phase splitter with two phase differentiated output paths for the measurement;
an adjustable gain element in each output path;
a feedback summing element for summing signals on the output paths,
means for generating a difference signal from of the output of the feedback summing element and the reference input signal; and
a weight adjusting element taking the output of the means for generating a difference signal as an input and automatically adjusting the gains of the adjustable gain elements to drive the difference signal to zero.

15. The feedback control system of claim 14 wherein the gain of pairs of weight adjustment elements from the gain and phase adjustment network and from the estimation network are always the same.

16. The feedback control system of claim 15 wherein the estimation network further comprises a peak detector responsive to the feedback signal for controlling size of a convergence step for use in iterative determination of transmission path gain.

17. The feedback control system of claim 16, wherein the peak detector comprises;
a charge circuit taking the feedback signal as its input; and
a discharge circuit, the discharge circuit including a zero crossing detector taking the command signal as input, discharge of the charge circuit being initiated once each cycle of the command signal.

18. The feedback control system of claim 17, wherein the discharge circuit of the peak detector has a long time constant relative to the charging time constant.

19. The feedback control system of claim 18 wherein the peak detector time constants are dependent upon command signal frequency so that all time constants are expressible in cycles.

20. The feedback control system of claim 16 and further comprising a pause means responsive to transients in command signal static component levels and to command signal frequency for interrupting operation of the estimation network.

21. The feedback control system of claim 18 and further comprising a digital signal processor, programmed to operate as a circuit metaphor of the amplitude and phase adjustment network, the estimation network and the peak detector network.

22. A feedback control system comprising:
means for generating a plurality of frequency and phase synchronized sinusoidal command signal components;
reference input means for adjusting the amplitude and phase of each sinusoidal command signal component independently to generate one reference input signal associated with each sinusoidal command signal component;
a controlled system;
signal summing means responsive to the reference input signals and feedback signals for generating error signals;
a plurality of actuator means, each being responsive to one error signal, for directly manipulating the controlled system;
feedback signal means for generating one feedback signal for each actuator means; and
the reference input means being responsive to each feedback signal and an associated command signal component for determining an estimation error signal and for using the estimation error signal to adjust the amplitude and phase of the reference input signals to drive the estimation error signal to zero.

23. The feedback control system of claim 22 wherein the reference input means further comprise:
an amplitude and phase adjustment network for each command signal, each amplitude and phase adjustment network providing a signal processing network operating as a metaphor of the trigonometric identity $w_0\sin(\omega t)+w_1\sin(\omega t+\phi)=C\sin(\omega t+\phi_c)$.

24. The feedback control system of claim 22 wherein each signal processing network comprises:
phase differentiating means for producing two signals with the same frequency as an applied command signal component but with a phase difference of $\phi$;
means for adjusting the amplitudes of each of the two signals produced by the phase differentiating means by weights $w_0$ and $w_1$, respectively; and
means for summing the weighted signals.

25. The feedback control system of claim 24 wherein $\phi$ is an angular phase difference of approximately 90°.

26. The feedback system of claim 25 wherein the reference input means further comprises:
iterative means responsive to the estimation error signal for adjusting the weights $w_0$ and $w_1$ to reduce the estimation error signal to zero.

27. The feedback control system of claim 14 wherein each actuator means comprises:
a proportional integral differential servocontroller responsive to an error signal for generating an actuation signal; and
an actuator responsive to the actuation signal.

28. The feedback control system of claim 27 and further comprising means for automatically tuning the proportional integral differential servocontroller, the automatic tuning means comprising:
means for determining the open loop frequency response of the feedback loop.

* * * * *

UNITED STATES PATENT AND TRADEMARK OFFICE
CERTIFICATE OF CORRECTION

PATENT NO. : 5,124,626
DATED : June 23, 1992
INVENTOR(S) : BRADFORD K. THOEN

It is certified that error appears in the above-identified patent and that said Letters Patent is hereby corrected as shown below:

Col. 14, lines 44 and 58, delete "e", insert ω
Col. 15, line 7, delete "claim", insert "claim 2"
Col. 15, line 10, delete "claim", insert "claim 3"
Co. 15, line 14, delete "claim", insert "claim 1"

Signed and Sealed this

Twentieth Day of July, 1993

Attest:

MICHAEL K. KIRK

Attesting Officer    Acting Commissioner of Patents and Trademarks